J. J. REICHARD.

Saw Set.

No. 83,792.

Patented Nov. 3, 1868.

WITNESSES:
W H Haskell
J M Ranny

INVENTOR:
J. J. Reichard

JOHN J. REICHARD, OF CANTON, ILLINOIS.

Letters Patent No. 83,792, dated November 3, 1868.

IMPROVEMENT IN SAW-SET.

The Schedule referred to in these Letters Patent and making part of the same.

Be it known that I, JOHN J. REICHARD, of Canton, in the county of Fulton, and State of Illinois, have invented a new and useful Machine for Setting Circular, Gate, or other Large Mill-Saws; and I do hereby declare that the following is a full, clear, and exact description of the construction and operation of the same, reference being had to the annexed drawings, making a part of this specification, in which—

Figure 1:
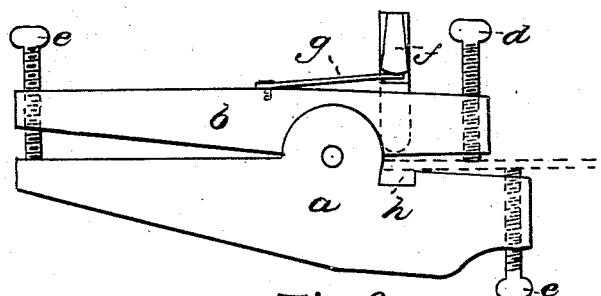
Figure 2:
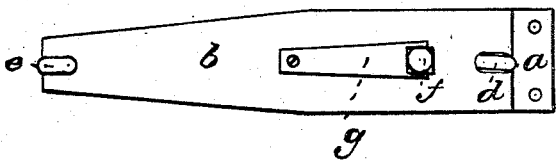
Figure 3:
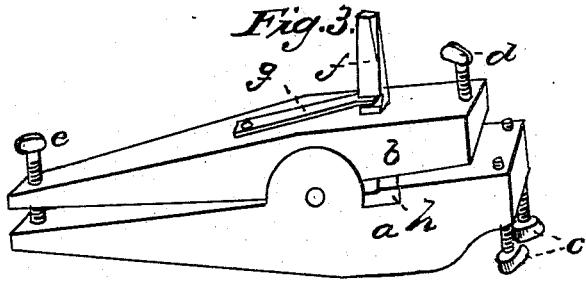

Figure 1 is a longitudinal view;
Figure 2 is a vertical view; and
Figure 3 is a perspective view.

The nature of my invention consists in setting any circular, gate, or mill-saw, while in its frame, or on its shaft, or any large cross-cut saw, (such as is used in cutting logs in the woods,) by using, in the hand, a heavy cast-iron set, weighing from twelve to fifteen pounds, that it may be strong, and its inertia overcome the stroke of the hammer, which set is furnished with screws, to adjust the bevel of the teeth, and, to secure the set to the saw-plate, a punch, of steel, to strike the tooth when properly placed and secured, thus expeditiously and uniformly setting each tooth, without removing the saw.

To enable others skilled in the manufacture of such articles to make and use my invention, I will proceed to describe its construction and operation.

The jaws $a$ and $b$ are of cast-iron, connected by a segment-joint, $b'$, the inner segment being attached to $b$, and the outer ones to $a$. The screws $c\ c$ and $d$, of iron, give the required set of tooth on the bevel of the steel plate $h$.

When the machine is firmly secured to the saw by adjustment of iron screw $e$, by striking the steel punch $f$, the tooth is set as desired. Then unscrew $e$, and place the set on the next tooth, tighten $e$, strike the punch $f$; thus each tooth is to be set, in no case changing $c\ c$ and $d$ after the bevel is determined. The punch $f$ is kept free from the teeth by means of the steel spring $g$.

What I claim as my invention, and desire to secure by Letters Patent, is—

A saw-set, composed of jaws $a\ b$, anvil $h$, punch $f$, spring $g$, and set-screws $c\ d$, constructed and arranged as described, and for the purposes set forth.

JOHN J. REICHARD.

Witnesses:
W. H. HASKELL,
J. H. RAIREY.